United States Patent
Polakos

(10) Patent No.: US 7,995,482 B2
(45) Date of Patent: Aug. 9, 2011

(54) FEMTO BASE STATIONS AND METHODS FOR OPERATING THE SAME

(75) Inventor: Paul Polakos, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 235 days.

(21) Appl. No.: 12/457,321

(22) Filed: Jun. 8, 2009

(65) Prior Publication Data

US 2010/0309790 A1  Dec. 9, 2010

(51) Int. Cl.
*H04L 12/26* (2006.01)
*H04L 12/28* (2006.01)
(52) U.S. Cl. .................... 370/241; 370/254
(58) Field of Classification Search ............. 370/241, 370/254; 455/403, 422.1, 450, 452.1, 456.1, 455/456.2
See application file for complete search history.

(56) References Cited

U.S. PATENT DOCUMENTS

| | | | |
|---|---|---|---|
| 2008/0085722 A1* | 4/2008 | Hirano et al. | 455/452.1 |
| 2008/0299992 A1* | 12/2008 | Eitan et al. | 455/456.5 |
| 2008/0318596 A1* | 12/2008 | Tenny | 455/456.2 |
| 2009/0290502 A1* | 11/2009 | Tinnakornsrisuphap et al. | 370/252 |
| 2010/0120394 A1* | 5/2010 | Mia et al. | 455/404.2 |
| 2010/0120447 A1* | 5/2010 | Anderson et al. | 455/456.1 |
| 2010/0159945 A1* | 6/2010 | Brisebois | 455/456.1 |
| 2010/0173661 A1* | 7/2010 | Miyazaki et al. | 455/507 |

* cited by examiner

*Primary Examiner* — Chi H Pham
*Assistant Examiner* — Robert Lopata
(74) *Attorney, Agent, or Firm* — Harness, Dickey & Pierce, PLC

(57) ABSTRACT

Femto base stations and methods described herein suppress the need for an external GPS antenna and cable, while still providing a network service provider with the ability to obtain the desired GPS location coordinates and the user with the flexibility of placing the femto cell at the location of their choice within a home regardless of GPS signal strength.

20 Claims, 4 Drawing Sheets

FEMTO BASE STATIONS AND METHODS FOR OPERATING THE SAME

BACKGROUND OF THE INVENTION

A conventional femto base station is a small cellular base station, typically designed for use in residential, small business, or other environments in which the served coverage area is relatively small. Conventional femto base stations are usually installed indoors (e.g., in a home or office), and connected to a wireless service provider's core network via cable, a digital subscriber line (DSL), an on-premise fiber optic link, a similar Internet Protocol (IP) or other packet-based backhaul network. Conventional femto base stations provide improvements to both coverage and capacity of wireless networks. Femto base stations typically support about 2 to 5 mobile phones.

FIG. 1 illustrates a conventional femto cell or coverage area 110 served by a conventional femto base station 150. The femto base station 150 is connected to an Internet Protocol (IP) network 120, and incorporates the functionality of a typical base station in serving mobile stations 102-10M. This connection to the IP network 120 is used to integrate the femto base station 150 with the wireless operator's core network (not shown).

In order to implement and control usage of femto base stations, service providers must have reasonably accurate and reliable information regarding the location of femto base stations (e.g., residential or commercial) at the time of installation. This location information is necessary to determine, for example, the frequency band to which the femto base station should be tuned. As is well-known, frequency bands are dictated by service provider radio transmission licenses, which are dependent on geographic location. In addition, a femto base station must be tuned to the proper frequency band to comply with mandated government emergency response regulations concerning location (e.g., E911).

Cost constraints imposed by the femto cell market further require that conventional femto base stations be user deployable. As a result, femto base stations must employ a highly-automated process to put the femto base station in operation, which is only minimally augmented by the user. This highly automated process must provide the wireless network operator with the required location information for the femto base station, while also allowing the consumer the flexibility to place the femto base station at the location of their choice. Finally, the highly automated procedure must be robust in that once the femto base station is installed and its location is reported to the network, re-locating the femto base station does not go undetected and unreported.

Conventionally, a reliable source of accurate location information is the well-known global positioning system (GPS). A femto base station having a well-known GPS receiver is capable of automatically determining its location worldwide provided that the GPS receiver is able to successfully detect and decode GPS timing/tracking signals from a minimum number of satellites (e.g., normally greater than or equal to 4). However, a major obstacle to using GPS systems to determine and track the location of a femto base station is presented when the femto base station is located indoors because satellite signal penetration indoors is highly unreliable.

To overcome the building signal penetration problem, the GPS receiver in a conventional femto base station is commonly provided with an external antenna. The external antenna is placed at a location having sufficient signal transparency to the outside (e.g., typically attached to a window) such that the GPS receiver is able to successfully detect and decode GPS signals. But, this solution has its drawbacks. For example, in most cases the additional cost of the external antenna and cable are comparable to (if not he same as) the cost of the GPS receiver itself. In addition, this solution further burdens the user because the external antenna must be installed (usually permanently or semi permanently) on a window. Extra cables must also be routed around the residence or business in the event that Internet access is not located close to a window.

SUMMARY OF THE INVENTION

Example embodiments provide femto base stations and methods of operating the same. The femto base stations and methods described herein suppress the need for external global positioning system (GPS) antennas and cables, while continually enabling a network service provider to obtain desired position information (e.g., GPS location coordinates). Methods described herein also provide the user with the flexibility to place the femto base station at the location of his/her choice within the home or business regardless of GPS signal strength.

At least one example embodiment provides a method of operating a femto base station in a wireless network. According to at least this example embodiment, the femto base station decides whether position information signals are available. If position information signals are unavailable, the femto base station determines whether anchor position information stored in a memory at the femto base station is valid. The anchor position information is indicative of an anchor position of the femto base station. The femto base station or other network component then identifies network configuration parameters for the femto base station if the stored anchor position information is valid.

At least one other example embodiment provides a method of operating a femto base station in a wireless network. According to at least this example embodiment, the femto base station acquires a location fingerprint for the femto base station. The acquired location fingerprint is stored in the memory in association with anchor position information for the femto base station. The associated location fingerprint is indicative of a position of the femto base station. The femto base station re-acquires a location fingerprint in response to a trigger event. The femto base station compares the re-acquired measured location fingerprint with the stored location fingerprint, and determines whether the anchor position information associated with the stored location fingerprint is valid based on the comparison.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Example embodiments provide femto base stations and methods of operating the same. The femto base stations and methods described herein suppress the need for external global positioning system (GPS) antennas and cables, while continually enabling a network service provider to obtain desired position information (e.g., GPS location coordinates). Methods described herein also provide the user with the flexibility to place the femto base station at the location of his/her choice within the home or business regardless of GPS signal strength.

It is noted that example embodiments are described as apparatuses depicted as block diagrams and processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods and apparatuses illustrated by the flow charts and block diagrams discussed below may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

As disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, and various other mediums capable of storing and/or containing instruction(s) and/or data.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
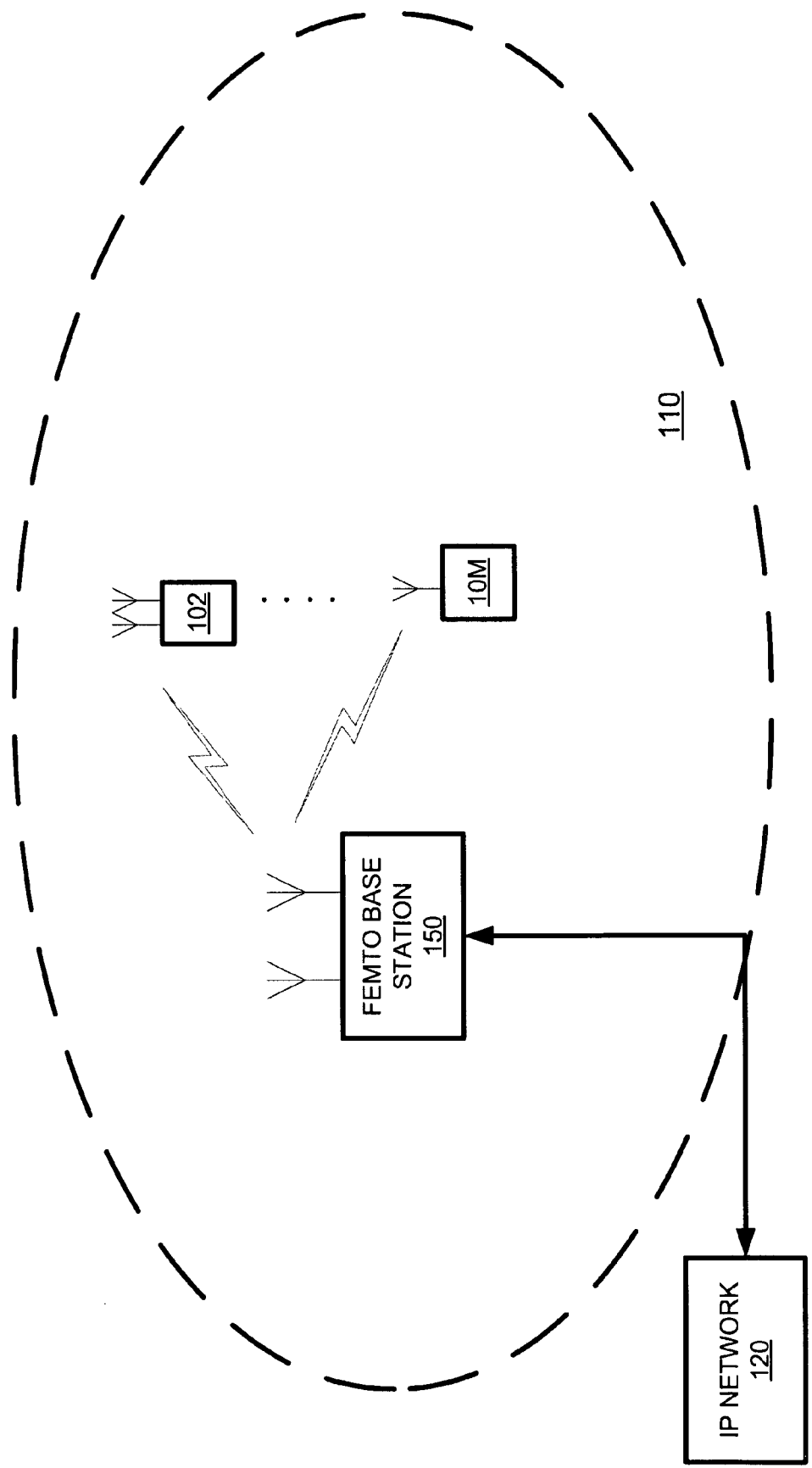
FIG. 1 illustrates a conventional femto cell.
Figure 2:
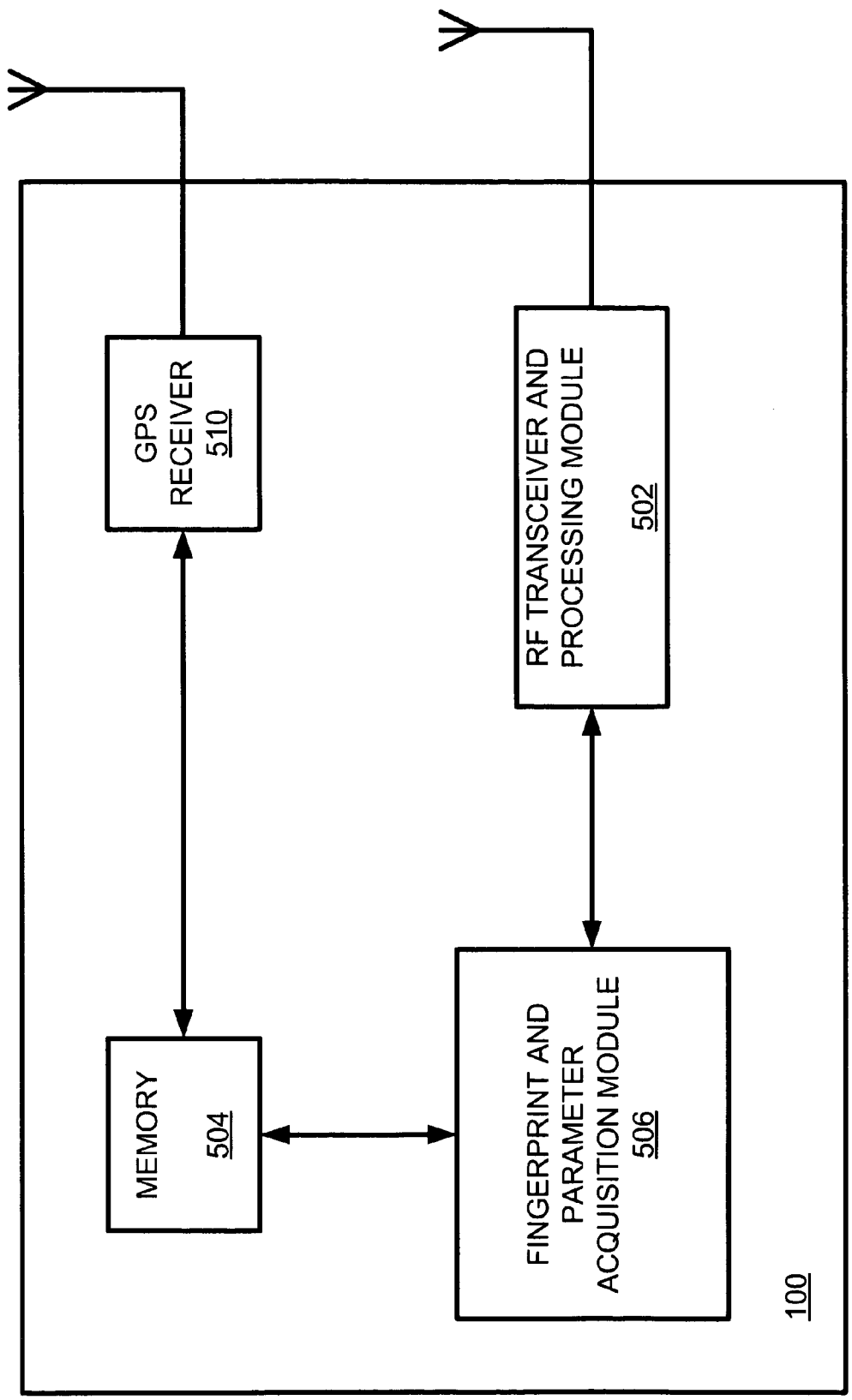
FIG. 2 illustrates a femto base station according to an example embodiment.

FIG. 2 is a block diagram illustration of a femto base station according to an example embodiment. The femto base station 100 in FIG. 2 may serve as the femto base station 150 in FIG. 1. The femto base station 100 in FIG. 2 may perform all well-known femto base station functions in addition to the functionality discussed herein.

The femto base station 100 is illustrated as including various modules or blocks (e.g., fingerprint and parameter acquisition module 506), each of which may represent a module structure within a processor, field programmable gate array (FPGA), application specific integrated circuit (ASIC), etc., thereby rendering that computing structure a special purpose, structured computer or processor, rather than a general purpose computer or processor. In one example, each of the modules or blocks in the block diagram shown in FIG. 2 may constitute a separate module portion or hardware component of the femto base station 100.

Referring to FIG. 2, the femto base station 100 includes a GPS receiver 510 configured to detect and decode position information signals to acquire position information for the femto base station 100. The GPS receiver 510 may be a well-known integrated GPS receiver including an antenna (e.g., internal or external antenna). The GPS receiver 510 acquires position information for the femto base station 100 by detecting and decoding GPS timing/tracking signals from a plurality of (e.g., about 4) GPS satellites to acquire GPS coordinates regarding the location of the femto base station 100. The acquired GPS coordinates serve as the position information for the femto base station 100. Because integrated GPS receivers and methods for acquiring GPS coordinates to determine a given location are well-known in the art, a more detailed description will be omitted.

The GPS receiver 510 stores the acquired position information in a memory 504 in association with other location and time information, which will be discussed in more detail below. The memory 504 may be any well-known non-volatile memory.

Equipped as described, femto base stations according to example embodiments are capable of obtaining and storing position information (e.g., GPS coordinates) in association with a time stamp in the memory 504 when the femto base station 100 is (temporarily) located at a place with sufficiently strong GPS signals (e.g., near a window). The position information is indicative of the femto base station's location, and the time stamp is indicative of the time at which the position information was acquired.

The femto base station 100 further includes a radio-frequency (RF) transceiver module 502. The RF transceiver module 502 performs conventional femto base station functions associated with serving mobile phones within a femto base station's coverage area or cell (e.g., femto cell 10 in FIG. 1). The RF transceiver and processing module 502 communicates with a fingerprint and parameter acquisition module 506.

The fingerprint and parameter acquisition module 506 is configured to acquire a location fingerprint for the femto base station, network characteristics and network parameters for the network in which the femto base station 100 is currently located.

More specific functions and processes performed by the above-described components of the femto base station 100 will be discussed in more detail below with regard to the methods shown in FIGS. 3 and 4.

Figure 3:
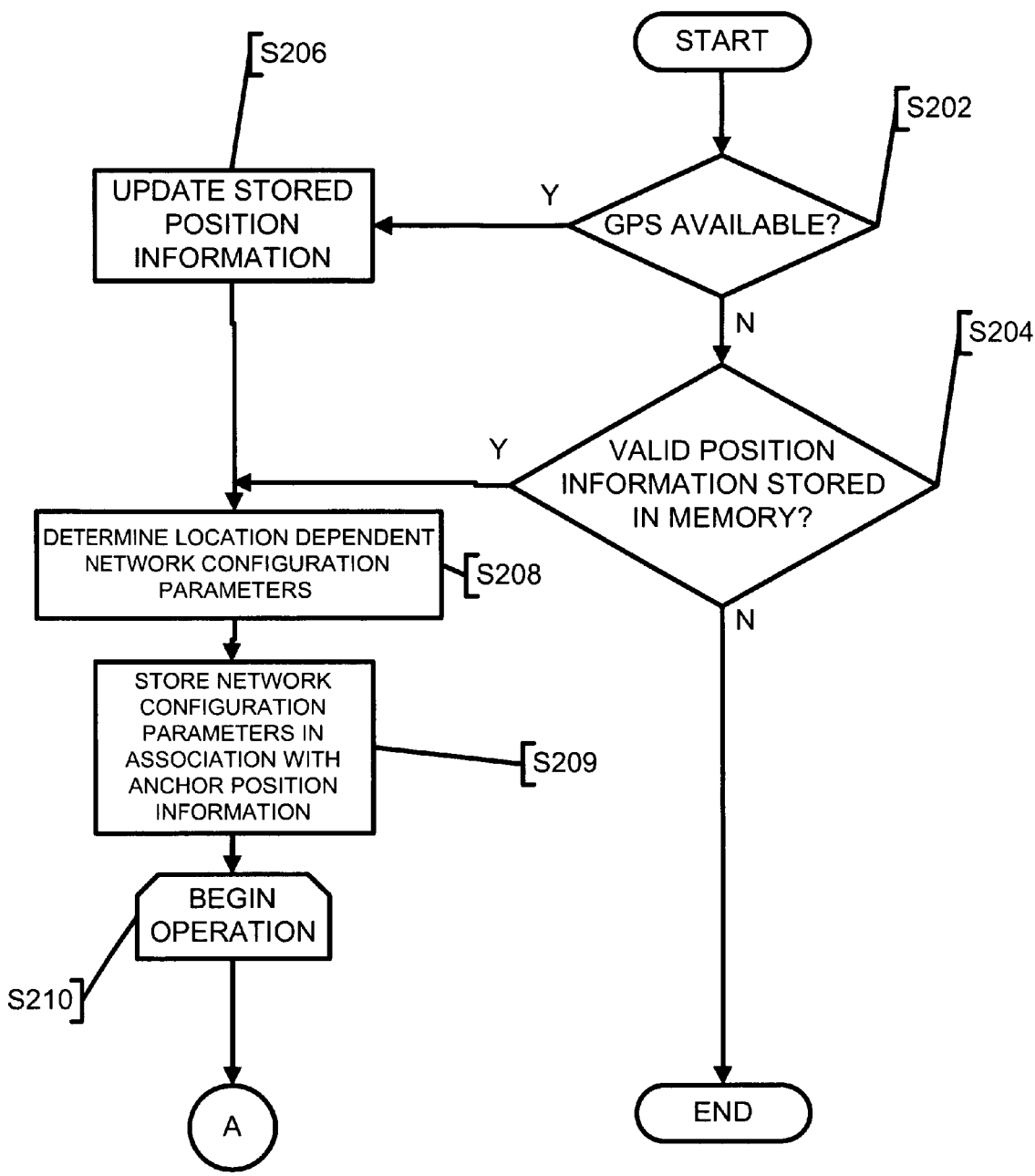
FIGS. 3-4 illustrate methods for operating femto base stations according to example embodiments.

FIG. 3 illustrates a method of operating a femto base station according to an example embodiment. The method shown in FIG. 3 will be discussed with regard to the femto base station 100 shown in FIG. 2. However, the methods discussed herein may be implemented in conjunction with other femto base stations.

In one example, as an initial part of an installation procedure, a user first places the femto base station 100 near a window, connects the femto base station 100 to AC power, and turns it on. During the automated startup procedure the GPS receiver 510 acquires position information for the femto base station 100 as discussed above. The position information and the time at which the position information was acquired (e.g., time stamp) are stored in association with one another in the memory 504. Connection to the Internet (e.g., via digital subscriber line (DSL), cable modem, etc.) is not required during the initial part of the installation procedure.

The time at which the position information is acquired (time stamp) may be determined based on a clock internal to the femto base station 100, or alternatively, based on GPS timing signals used to acquire the position information. An external indicator (e.g., visual indicator such as light emitting diode (LED) or audible indicator) may be provided to signal when a successful position information and associated time stamp have been acquired and stored. The acquired position information stored in the memory 504 is referred to as the "anchor position information," or "anchor location information," of the femto base station 100. The position or location corresponding to the "anchor position information," or "anchor location information," is referred to as the "anchor position," or "anchor location."

After having stored the anchor position information, the user is able to disconnect the femto base station 100 from the AC power and relocate the femto base station 100 within the residence at any location (e.g., near a digital subscriber (DSL) modem, cable modem, etc.), regardless of the ability to detect and decode GPS signals at that location. Once relocated, the femto base station 100 is once again plugged in and powered up. Upon powering up, the femto base station 100 performs the method shown in FIG. 3.

Referring to FIG. 3, after powering up, the GPS receiver 510 determines whether sufficiently strong GPS signals are available at step S202. If the GPS receiver 510 determines that GPS signals of sufficient strength are available, the GPS receiver 510 acquires updated position information (e.g., GPS coordinates) for the femto base station 100. The GPS receiver 510 then updates the stored anchor position information for the femto base station 100 in the memory 504 at step S206.

At step S208, the fingerprint and parameter acquisition module 506 determines location dependent network configuration parameters (e.g., operating frequency band, cell neighbor relations, etc.). The location dependent network configuration parameters are separate from the location fingerprint. In one example, the location dependent network configuration parameters are a set of parameters that govern the operation of the femto base station or femtocell. The femto base station uses a valid anchor position to determine the location-dependent parameters. The determination of network parameters may be made in conjunction with the network management system in any well-known manner.

The location dependent network configuration parameters comprise one of two subsets of network configuration parameters. In addition to the location dependent network configuration parameters, there are also location-independent parameters such as, default transmit power, Cell ID, etc.

At step S209, the fingerprint and parameter acquisition module 506 stores the acquired network configuration parameters in the memory 504 in association with the stored anchor position information.

After storing the acquired network configuration parameters at step S209, the femto base station 100 begins regular operation at step S210 serving mobile stations within its coverage area (e.g., mobile stations 102-10M in FIG. 1). As discussed in more detail below, during normal operation, the femto base station 100 may perform the method shown in FIG. 4.

Returning to step S202, if GPS signals of sufficient strength are not available, the femto base station 100 checks whether the anchor position information stored in the memory 504 is valid at step S204. In one example, the femto base station 100 checks if the anchor position information stored in the memory 504 is valid by measuring or calculating the elapsed time since the stored anchor position information was obtained and comparing the elapsed time with a validity time interval threshold.

The elapsed time since the stored anchor position information was obtained is the difference between the time stamp associated with the stored anchor position information and the current time.

If the elapsed time is greater than the validity time interval threshold, the femto base station 100 determines that the stored anchor position information is not valid. Otherwise, if the elapsed time is less than or equal to the validity time interval threshold, the femto base station 100 determines that the stored anchor position information is valid.

According to example embodiments, anchor position information for which the elapsed time is less than or equal to the validity time interval threshold may also be referred to as "recently acquired," anchor position information. But, as will become more apparent from the discussion of FIG. 4, anchor position information for the femto base station 100 may still be considered valid, even if it is not considered recently acquired.

The validity time interval threshold is used to ensure that the femto base station 100 is moved only within a given distance of its anchor position. Acquired anchor position information for the femto base station 100 is considered valid only for the prescribed validity time interval following its acquisition. During this time, the femto base station 100 may be moved to a more convenient location without regard to the availability of a GPS signal. If the validity time interval is appropriately limited, then the distance between the anchor position and the current position of the femto base station 100 will also be appropriately limited. As a result, the anchor position may then be used to represent the current position with acceptable accuracy. In one example, the validity time interval threshold may be between about 5 and about 15 minutes.

Still referring to step S204 in FIG. 3, if the anchor position information stored in the memory 504 is not valid, the femto base station 100 determines that it is not positioned within an acceptable distance from its anchor position. Based on this determination, the femto base station 100 must be re-initialized before operating. Re-initialization involves re-acquisition of position information for the femto base station through, for example, execution of the above-described initial part of the installation procedure.

Returning again to step S204, if the anchor position information stored in the memory 504 is valid, the femto base station 100 determines that it is positioned within an acceptable distance from its anchor position. After having verified that the femto base station 100 is within an acceptable distance from the anchor position (e.g., within range of the anchor position), the process continues to step S208 and proceeds as discussed above.

The above-described example embodiment provides the user the flexibility to place the femto base station at the location of their choice, while still suppressing or preventing any change in location from going undetected and/or unreported.

The flexibility of at least the above-described example embodiment may be further enhanced by associating an independent "location-fingerprint" with the stored anchor position information. A location fingerprint may be a measured environmental characteristic associated with the anchor position of the femto base station 100. By logically associating the location fingerprint with the stored anchor position information, the validity of anchor position information may be logically inferred so long as the location fingerprint remains unchanged. This capability enables continuous operation following a service interruption (e.g., power failure) without the need to re-acquire position information for the femto base station 100 even if the elapsed time since acquisition of the anchor position information is greater than the validity time interval threshold. Indeed, generally during normal operation, the femto base station 100 may be powered-on indefinitely such that the above-described process shown in FIG. 3 need not be performed.

Figure 4:
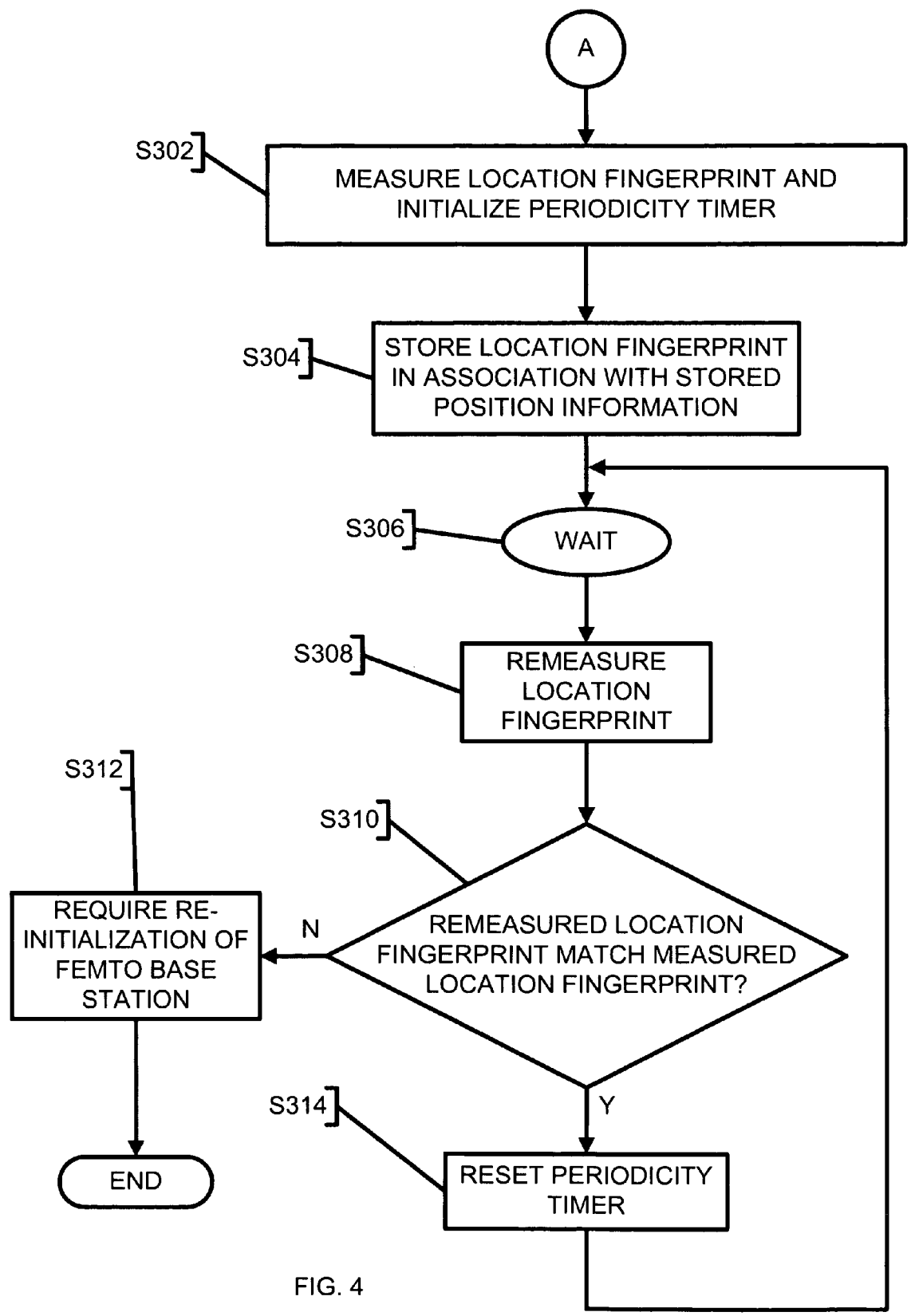

FIG. 4 illustrates a method of operating a femto base station utilizing the aforementioned location fingerprint. The method described below may be performed at various instances of the configuration process shown in FIG. 3, or after the configuration and begin operation processes shown in FIG. 3 have been completed; that is, during normal operation. For example, the process shown in FIG. 4 may be performed within step S208, during step S210, or subsequent to step 210. Moreover, the method shown in FIG. 4 may be performed periodically. The periodicity at which the method is performed may be defined by a manufacturer of the femto base station or network service provider as desired. An appropriately set value for the periodicity may be used to limit the time that may elapse between relocation and detection of the femtocell.

In one particular example, the method shown in FIG. 4 may be performed subsequent to completion of the method shown in FIG. 3, which is performed in response to re-location of the femto base station 100 and after the initial part of the installation procedure.

The example embodiment shown in FIG. 4 will be described with regard to the femto base station 100 shown in FIG. 2.

Referring to FIG. 4, at step S302 the fingerprint and parameter acquisition module 506 measures a location fingerprint for the femto base station 100 and initializes a periodicity timer. The periodicity timer is indicative of the periodicity at which the location fingerprint is re-measured to ensure that the femto base station 100 remains located within a given distance from its anchor position. The periodicity timer may be a given length defined by a network operator or manufacturer of the femto base station. As will be discussed in more detail below, expiration of the periodicity timer may serve as an event trigger, which triggers re-measuring of the location fingerprint. The anchor location fingerprint may include, for example, at least one of: characteristics of a radio environment in which the femto base station 100 is located; and network parameters unique to a point of connection of the femto base station 100 in the network. Network parameters unique to the point of connection of the femto base station 100 may include media access control (MAC) or internet protocol (IP) addresses of one or more hosting gateways.

In one example, the fingerprint and parameter acquisition module 506 and may include a separate radio-frequency (RF) receiver configured to sense unique features or characteristics of the radio environment in which the femto base station 100 is located. Alternatively, the fingerprint and parameter acquisition module 506 utilizes the RF receiver circuitry of the RF transceiver and processing module 502 (which may be a cost convenience, but is not required). Characteristics of the radio environment may include: RF spectral signatures unique to local transmitting equipment, which are described in more detail in *Passive Steady State RF Fingerprinting: A Cognitive Technique for Scalable Deployment of Co-Channel Femto Cell Underlays* by Kennedy, I. O., as well as Scanlon, P. et al., *New Frontiers in Dynamic Spectrum Access Networks*, 2008. DySPAN 2008. 3rd IEEE Symposium on 14-17 Oct. 2008, the entire contents of which are incorporated herein by reference.

Location fingerprints may include unique information (e.g., cell IDs) related to surrounding cells, frequency maps of neighbor cells in frequency planned networks, unique signatures related to usage of broadband radio and television spectrum, etc.

Returning to FIG. 4, after acquiring a location fingerprint, the fingerprint and parameter acquisition module 506, at step S304, associates the acquired location fingerprint with the anchor position information for the femto base station 100. Also at step S304, the fingerprint and parameter acquisition module 506 stores the acquired location fingerprint within the memory 504 in association with the anchor position information for the femto base station 100. The anchor position information is obtained as described above.

After having stored the acquired location fingerprint in association with the anchor position information, the femto base station 100 enters a wait state at step S306. In the wait state, the femto base station 100 awaits the occurrence of a trigger event. The trigger event may be, for example, expiration of the periodicity timer or counter or spontaneous service restoration following service outage (e.g., a power failure).

Once the trigger event has occurred, the fingerprint and parameter acquisition module 506 re-measures a location fingerprint for the femto base station 100 at step S308. The fingerprint and parameter acquisition module 506 re-measures the location fingerprint in the same manner as described above with regard to step S302.

At step S310, the fingerprint and parameter acquisition module 506 compares the re-measured location fingerprint with the stored location fingerprint. If the stored location fingerprint matches the re-measured location fingerprint, the above-described periodicity timer is reset at step S314. The process then returns to the wait state at step S306 and continues as discussed above.

Returning to step S310, if the re-measured location fingerprint does not match the stored location fingerprint, the femto base station 100 requires re-initialization at step S312. In one example embodiment, the femto base station 100 will not operate until reinitialized. Re-initialization of the femto base station involves re-acquisition of position information for the femto base station through, for example, execution of the above-described initial part of the installation procedure.

In the method shown in FIG. 4, so long as the location fingerprint remains unchanged, the associated anchor position information for the femto base station 100 is considered valid. Accordingly, the femto base station 100 need not re-perform the process described above with regard to FIG. 3 or be re-initialized, even if the stored anchor position information is no longer considered "recently acquired."

At least one example embodiment suppresses and/or eliminates the need for an external GPS antenna and cable, while still providing a network service provider with the ability to obtain the desired GPS location coordinates and the user with the flexibility of placing the femto cell at the location of their choice within a home regardless of GPS signal strength.

The invention being thus described, it will be obvious that the same may be varied in many ways. Such variations are not to be regarded as a departure from the invention, and all such modifications are intended to be included within the scope of the invention.

I claim:

1. A method operating a femto base station in a wireless network, the method comprising:

deciding, at the femto base station, whether position information signals are available;

determining, at the femto base station, whether anchor position information stored in a memory at the femto base station is valid if the deciding step decides that position information signals are unavailable, the anchor position information being indicative of an anchor position of the femto base station; and identifying network configuration parameters for the femto base station if the determining step determines that the stored anchor position information is valid.

2. The method of claim 1, further comprising:
acquiring current position information for the femto base station based on the available position information signals if the deciding step decides that position information signals are available; and
storing, in the memory, the current position information as the anchor position information.

3. The method of claim 1, further comprising:
acquiring the anchor position information for the femto base station based on received position information signals; and
storing the acquired anchor position information in the memory.

4. The method of claim 3, wherein the determining step further comprises:
calculating an elapsed time since the stored anchor position information was acquired;
comparing the elapsed time with a validity time interval threshold value; and
determining whether the stored anchor position information is valid based on the comparing step.

5. The method of claim 4, wherein the stored anchor position information is valid if the elapsed time is less than or equal to the validity time interval threshold value.

6. The method of claim 4, wherein the stored anchor position information is not valid if the elapsed time is greater than the validity time interval threshold value.

7. The method of claim 1, wherein the network configuration parameters include at least a frequency band for use by the femto base station.

8. The method of claim 1, further comprising:
acquiring, at a first power-up of the femto base station, the anchor position information;
storing the acquired anchor position information in the memory;
powering down the femto base station; and wherein
the deciding step is initiated in response to a subsequent power-up of the femto base station.

9. The method of claim 1, wherein a location fingerprint is stored in association with the anchor position information in the memory, the method further comprising:
identifying a current location fingerprint for the femto base station; and wherein
the determining step determines whether the stored anchor position information is valid based on the stored location fingerprint and the current location fingerprint.

10. The method of claim 9, wherein the determining step determines the stored anchor position information is valid if the stored location fingerprint matches the current location fingerprint.

11. The method of claim 9, wherein the stored location fingerprint includes at least one of characteristics of a radio environment in which the femto base station is located and network parameters unique to a point of connection of the femto base station.

12. The method of claim 11, wherein network parameters unique to the point of connection of the femto base station include media access (MAC) or Internet Protocol (IP) addresses of one or more hosting gateways.

13. The method of claim 9, wherein the identifying and determining steps are performed periodically in response to expiration of a periodicity timer.

14. The method of claim 9, wherein the identifying and determining steps are performed in response to a spontaneous power restoration.

15. The method of claim 9, further comprising:
requiring re-initialization of the femto base station if the re-determining step determines that the anchor position information for the femto base station is not valid.

16. The method of claim 1, further comprising:
transmitting and receiving information to and from mobiles after identifying the network configuration parameters.

17. A method of operating a femto base station, the method comprising:
acquiring, at the femto base station, a location fingerprint for the femto base station, the location fingerprint being indicative of a position of the femto base station;
storing, in a memory at the femto base station, the acquired location fingerprint in association with anchor position information for the femto base station;
re-acquiring a location fingerprint for the femto base station in response to a trigger event at the femto base station;
comparing the re-acquired measured location fingerprint with the stored location fingerprint; and
determining whether the anchor position information associated with the stored location fingerprint is valid based on the comparing step.

18. The method of claim 17, further comprising:
requiring initialization of the femto base station if the determining step determines that the anchor position information is not valid.

19. The method of claim 17, wherein the trigger event is a spontaneous power restoration.

20. The method of claim 17, wherein the trigger event is expiration of a periodicity timer.

* * * * *